United States Patent [19]

Cook

[11] Patent Number: 5,056,257
[45] Date of Patent: Oct. 15, 1991

[54] FISH HOOK CONSTRUCTION

[75] Inventor: Russell P. Cook, Wellesley, Mass.

[73] Assignee: Wellesley Research Associates, Inc., Wellesley, Mass.

[21] Appl. No.: 525,644

[22] Filed: May 21, 1990

Related U.S. Application Data

[63] Continuation-in-part of Ser. No. 441,638, Nov. 27, 1989, Pat. No. 4,987,696.

[51] Int. Cl.⁵ ............................................. A01K 83/00
[52] U.S. Cl. .................................................... 43/43.16
[58] Field of Search .......................... 43/43.16, 44.82

[56] References Cited

U.S. PATENT DOCUMENTS

| 699,397 | 5/1902 | Lacey | 43/43.16 |
| 2,896,359 | 7/1959 | Lanthier | 43/43.16 |
| 4,667,435 | 5/1987 | Fujimoto | 43/43.16 |

Primary Examiner—Kurt Rowan
Attorney, Agent, or Firm—Paul J. Cook

[57] ABSTRACT

A fish hook construction is provided which includes at least one stabilizer and wing of unitary construction. Each unitary construction is secured to the hook shank so that the wing portion is positioned at an angle between 30 to 60 degrees from the hook shank. The wing portion of the unitary construction is positioned substantially perpendicular to the plane defined by the shank and hook elbow.

5 Claims, 1 Drawing Sheet

FISH HOOK CONSTRUCTION

REFERENCE TO RELATED APPLICATION

This application is a continuation-in-part of application Ser. No. 441,638, now U.S. Pat. No. 4,987,686, filed Nov. 27, 1989.

BACKGROUND OF THE INVENTION

This invention relates to a fish hook construction adapted to increase the probability of implanting the hook into a fish and decreases the probability of swallowing the hook by a fish during use by an angler.

Prior to this invention, it has been proposed in U.S. Pat. No. 699,397 to provide a fish hook with a vane or a wing which extends in a direction from the hook shank directly opposite to the direction of extension of the hook. By utilizing such a wing or vane, when the line attached to the hook is pulled, the hook will move upwardly toward the direction of pull. This upward move is caused by the drag imposed by the wing or vane which functions as a fulcrum to provide the upward hook movement. If the hook is positioned so that the hook extends away from the fish, the sudden pulling and upward movement of the hook will cause the hook to move away from the fish thereby rendering the hook useless. Accordingly, it would be desirable to provide a fish hook which improves the probability of implanting the barbed point portion of the hook into the mouth of the fish during use by an angler.

SUMMARY OF THE INVENTION

This invention provides a fish hook construction which utilizes at least one unitary construction comprising a stabilizer and wing attached to a conventional hook positioned in a manner which promotes implanting the barbed point portion of the hook into the mouth of a fish during use by an angler. The wing portion of the unitary construction is positioned at an angle between 30 to 60 degrees from the hook shank in a direction toward the hook elbow as well as being positioned perpendicular to the plane defined by the shank and hook elbow. The probability of the hook being implanted into the mouth of the fish is substantially increased when the line attached to the hook is pulled by the angler.

DESCRIPTION OF SPECIFIC EMBODIMENTS

In accordance with this invention, a hook construction is provided comprising a hook shank, a hook barb attached to the hook shank unitary construction having a wing and a stabilizer attached to the hook shank and means for attaching the hook to a flexible line. The wing is positioned at an angle between 30 to 60 degrees from the hook shank in a direction substantially perpendicular to the plane defined by the shank and hook elbow. One or more unitary constructions each positioned in the same manner can be attached to the shank.

In use, when the line attached to the hook is pulled by the angler, the wing provides hydrodynamic lift so that the hook barb is lifted in a direction the same as the direction of the wing path. Since the wing is positioned at an angle between about 30° and 60° from the axis defined above, the hook is lifted in a direction toward the mouth of the fish. In any event, the hook is not lifted in a direction toward the fish mouth opening. Thus, the fish hook of this invention provides greatly improved probability of being implanted into the mouth of the fish.

Figure 1:
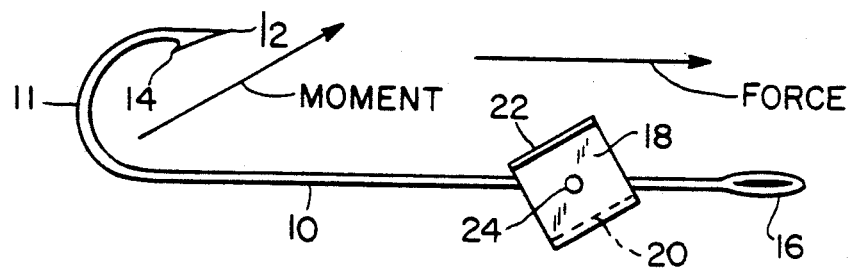
FIG. 1 is a side view of a hook construction of this invention having two wings positioned in opposite direction to each other.
Figure 2:
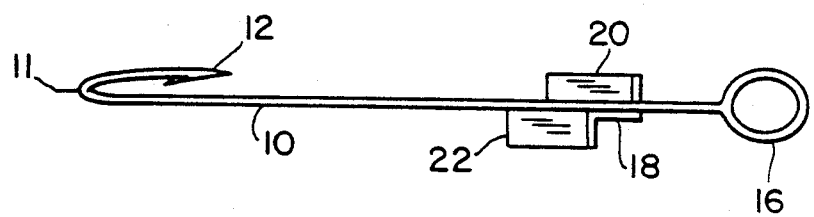
FIG. 2 is a top view of the hook of FIG. 1.

Referring to FIGS. 1 and 2, the fish hook construction of this invention comprises a fish shank 10, an elbow 11, a hook 12 and a hook barb 14 of unitary construction. A loop 16 is attached to shank 10 in order to provide a means for attaching a line to the hook construction. A unitary construction comprising a stabilizer 18 and two wings 20 and 22 extending in opposite directions to each other is attached to the hook shank 10 such as by a solder joint 24. The wings 20 and 22 extend in a direction between 30 to 60 degrees from the hook shank (See FIG. 1) as well as being positioned perpendicular to the plane defined by the shank 10 and hook elbow 11 from an axis defined by hook 12 and the cross section of shank 10. As shown in FIG. 1, the barb 14 extends from the hook 12 toward shank 10.

Figure 3:
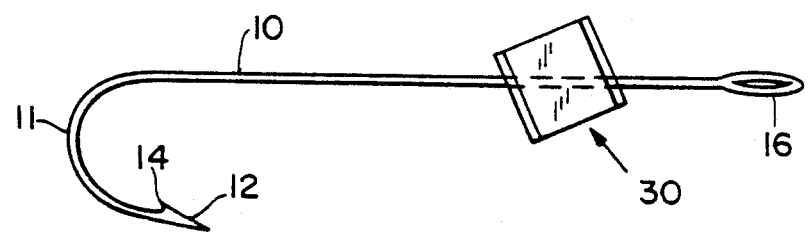
FIG. 3 is a side view of the hook of this invention having multiple unitary construction comprising a stabilizer and wings.
Figure 4:
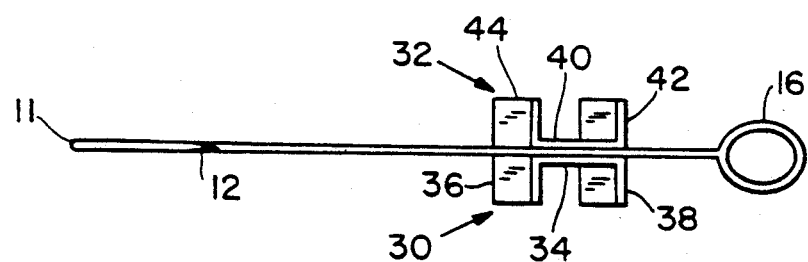
FIG. 4 is a top view of the hook of FIG. 3.

An alternative embodiment is shown in FIGS. 3 and 4 wherein reference numerals as in FIGS. 1 and 2 refer to the same fish hook construction elements. As shown in FIGS. 3 and 4, a plurality of U-shaped unitary constructions 30 and 32 are shown. The unitary construction 30 comprises a stabilizer 34 and two wings 36 and 38. The unitary construction 39 comprises a stabilizer 40 and two wings 42 and 44. The unitary constructions 30 and 32 are positioned so that the wings 36, 38, 42 and 44 are at an angle $\alpha$ between 30 and 60 degrees from the plane defined by the shank 10 and elbow 11.

Figure 5:
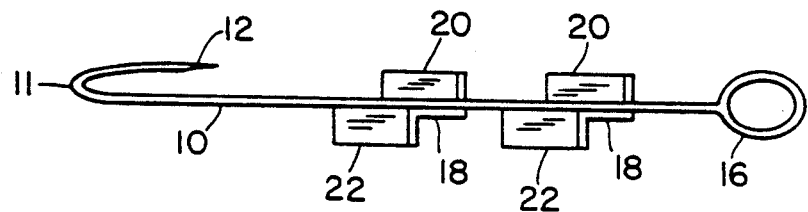
FIG. 5 is a side view of the hook of FIG. 1 with multiple unitary construction.
Figure 6:
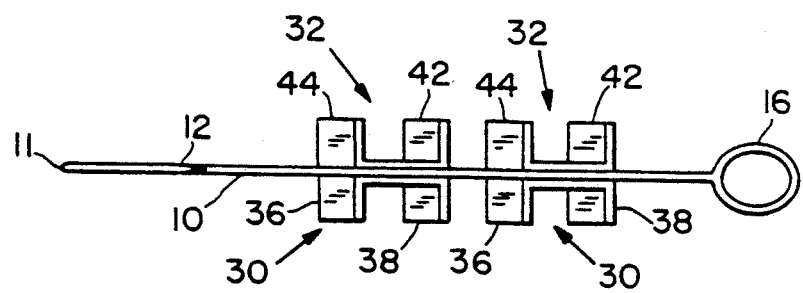
FIG. 6 is a top view of the hook of FIG. 4 with additional unitary construction.

As shown in FIGS. 5 and 6 additional unitary constructions having wings and a stabilizer can be added to the hook constructions of FIGS. 1-4.

The surface design of the wing is not critical to the present invention so long as it provides hydrodynamic drag when a line attached to the loop 16 is pulled. Thus, the wing can have a circular plan view, elliptical cross-section, triangular cross-section or the like and can be provided with small holes if desired. Also, the present invention contemplates one or a plurality of hooks attached to one or a plurality of hook shanks, each of which are attached to a common initary construction, if desired. Also, the wings can extend in the same direction from the stabilizer or in directions opposite to each other from the stabilizer.

I claim:

1. A fish hook construction which comprises a hook shank, a hook barb attached to said shank and defining one end of said construction, a unitary construction comprising a stabilizer secured to said shank, said stabilizer comprising a planar body in a plane substantially parallel to the plane of said hook barb and said hook shank and two wings secured to said stabilizer, said wings extending in a direction substantially perpendicular to said stabilizer, said wings being positioned at an angle between 30 and 60 degrees from the hook shank and means for attaching a line to said construction.

2. The construction of claim 1 wherein said wings extend in directions opposite to each other from said stabilizer.

3. The construction of claim 1 wherein said wings extend in the same direction from said stabilizer.

4. The construction of claim 2 wherein a plurality of unitary constructions are positioned on said shank in the direction as defined in claim 1.

5. The construction of claim 3 wherein a plurality of unitary constructions are positioned on said shank in the direction as defined in claim 1.

* * * * *